March 28, 1961 D. W. HAGELBARGER ET AL 2,977,575

CRYOTRON CIRCUITS

Filed Feb. 15, 1957 5 Sheets-Sheet 1

CRYOTRON CIRCUIT

RELAY CIRCUIT

RELAY CIRCUIT

INVENTORS: D. W. HAGELBARGER
E. F. MOORE
BY Alan C. Rose
ATTORNEY

CRYOTRON CIRCUIT

RELAY CIRCUIT

INVENTORS: D. W. HAGELBARGER
E. F. MOORE
BY Alan C. Rose
ATTORNEY

RELAY CIRCUIT

RELAY CIRCUIT

INVENTORS: D. W. HAGELBARGER
E. F. MOORE
BY Alan C. Rose
ATTORNEY

March 28, 1961 D. W. HAGELBARGER ET AL 2,977,575

CRYOTRON CIRCUITS

Filed Feb. 15, 1957 5 Sheets-Sheet 4

RELAY CIRCUIT

CRYOTRON CIRCUIT

CRYOTRON CIRCUIT

INVENTORS: D. W. HAGELBARGER
E. F. MOORE

BY Alan C. Rose

ATTORNEY

March 28, 1961 D. W. HAGELBARGER ET AL 2,977,575

CRYOTRON CIRCUITS

Filed Feb. 15, 1957 5 Sheets-Sheet 5

INVENTORS: D. W. HAGELBARGER
E. F. MOORE
BY Alan C. Rose
ATTORNEY

United States Patent Office 2,977,575 Patented Mar. 28, 1961

2,977,575

CRYOTRON CIRCUITS

David W. Hagelbarger, Morris Township, Morris County, and Edward F. Moore, Chatham, N.J., assignors to Bell Telephone Laboratories, Incorporated, New York, N.Y., a corporation of New York Filed Feb. 15, 1957, Ser. No. 640,535

10 Claims. (Cl. 340—173.1)

This invention relates to cryotron circuits.

A general object of the present invention is to provide novel cryotron circuits.

A particular object of the invention is to simplify bistable cryotron circuits.

In an article entitled "The Cryotron—A Superconductive Computer Component" which appeared at pages 482 through 493 of the April 1956 issue of the Proceedings of the I.R.E., volume 44, No. 4, Mr. D. A. Buck describes a circuit component in which the resistance of a control element varies with the applied magnetic field. The operation of the cryotron is based on the fact that different materials have different transition temperatures at which they become superconducting, and the additional fact that the application of a magnetic field to a superconductor lowers the transition temperature significantly. Thus, as explained in detail in the article cited above, with a core of tantalum and a winding of niobium immersed in liquid helium, the energization of the winding greatly increases the resistance of the core by bringing the core out of the superconducting state. This increase in the resistivity of the core is employed for control purposes.

Cryotron circuits have many advantages as compared with other types of logic circuits. For example, the individual cryotron elements are so small that a large scale, general purpose digital computer would occupy only about one cubic foot of space, and would therefore be relatively lightweight. In addition, the simple and rugged nature of the cryotron elements points to ease of fabrication and reliable circuit operation. The low power requirements for cryotron circuits is another advantage. This results from the fact that essentially no power is required in the normal superconducting state of the devices, and only relatively small amounts of power (a few milliwatts) are required for core switching.

Up to the present time, the cryotron has been considered to be an active element such as a vacuum tube or a transistor. While this conception of the cryotron was perhaps adequate for the initial studies of the device, it has led to circuits which are unnecessarily complex. For example, bistable cryotron circuits which have been proposed have utilized a pair of cryotrons cross-connected in a manner analogous to a bistable multivibrator.

The present invention is based on the realization that the cryotron closely approximates the dual counterpart of a relay circuit having front contacts. Consequently, a considerable body of highly developed relay technology is now available to the designer of cryotron circuitry. The additional techniques which are known for transforming relay circuit which include back contacts into appropriate relay circuits having only front contacts further broaden the scope of the relay art upon which circuit designers may draw. In addition to the advantages noted above, the resulting cryotron circuits have the property of operating at a much higher rate of speed than the comparable relay circuits.

In accordance with one aspect of the invention, a bistable cryotron circuit has been developed which is the dual of a relay with a front-contact hold circuit. In the relay circuit, the closure of a set of operate contacts in shunt with the front contacts of the relay energizes the relay and closes the hold circuit. The relay is deenergized by the closure of a set of release contacts which bypasses the relay coil.

The dual cryotron circuit includes a first cryotron having a winding and core having two terminals. One end of the winding is connected to one core terminal, and the cores of an operate cryotron and a release cryotron are connected to the other core terminal and the other end of the winding, respectively, of the first cryotron. Current normally flows through the cores of the first cryotron and the operate cryotron. When the operate cryotron is energized and its core becomes non-superconducting, the winding of the first cryotron is energized. The resultant magnetic field drives the core of the first cryotron out of the superconducting state, and current flows through the winding of the first cryotron and the core of the release cryotron. This condition is maintained until the energization of the release cryotron restores the circuit to its original state. Other closely related cryotron circuits will be discussed in detail in the course of the detailed descripton of embodiments of our invention.

It is a feature of this invention that cryotrons are inserted in an electrical circuit which is the dual of an electrical circuit including a plurality of relays, with the core and winding of each cryotron being connected to the points of the dual circuit which correspond dualitywise to the points in the relay circuit to which the front contacts and the winding, respetcively, of a relay are connected.

It is another feature of the invention that one core terminal and one end of the winding of a first cryotron are interconnected, and that the cores of two other cryotrons are directly connected to the other core terminal and the other end of the winding of said first cryotron, respetcively.

In accordance with an additional feature of the invention, a bistable cryotron circuit includes first and second parallel branch circuits, with the winding and core of a single cryotron being located respectively in the first and second branch circuits, and the second path also includes at least one additional cryotron core and does not include any cryotron windings.

It is a further feature of the invention that a plurality of cryotron windings are connected in series, and branch circuits including only cryotron cores are connected in shunt with selected ones of the series connected cryotron windings.

Other objects, features, and advantages of the invention may be readily apprehended from a consideration of the following detailed description and the accompanying drawing, in which.

The principle of duality, which for general purposes is well explained by E. A. Guillemin in "Communication Networks" (Wiley, 1935), volume 2, pages 246 and following, arises from a recognition that the following equations are mutually reciprocal in nature $$e=Ri \qquad i=Ge$$

where all of the symbols have their conventional meanings. Any quantity which in this sense is the reciprocal of another quantity is said to be the dual of that quantity. These equations are duals, and they show that complete duality exists between voltage, current, resistance, and conductance. We have:

| Quantity | Dual Quantity |
|---|---|
| Voltage<br>Resistance | Current<br>Conductance |

Techniques for transforming a given circuit into its dual are considered in detail in the Guillemin text cited above, and certain specific examples will be set forth in the course of the present description. It is characteristic of such transformations, however, that parallel electrical circuits become series circuits, for example, and that electrical elements in the dual circuit are also the dual of the elements in the original circuit.

The nature of the duality between cryotron and relay circuits discussed briefly above will now be considered in greater detail. A cryotron winding, being superconducting, develops substantially no back voltage. Accordingly, it is desirable to energize cryotron windings in series from a constant current source. The relay winding as used in switching circuits, however, is a voltage actuated device, and relay windings are characteristically connected in parallel.

The cryotron core is driven out of the superconducting state when the cryotron winding is energized. In the non-superconducting state the core has such a high resistance, as compared with its resistance when it is superconducting, that it may be considered to be an open circuit. Considering now a relay with a front contact, it may be noted that the resistance of the relay contacts is essentially zero when the relay winding is energized, and is infinite when the winding is de-energized.

Accordingly, with respect to the state of the control winding, the control element, or core, of a cryotron has an impedance which is the dual of that presented by the control element, or front contacts, of the relay. As indicated above, the energization requirement of a cryotron winding is dual to that of a relay, and the operation of the control element, or core, of a cryotron is dual to the operation of the control element or front contacts of a relay. Therefore, all that is required to transform many relay circuits into cryotron circuits is to obtain the dual circuit of the relay circuit in question and then substitute a cryotron winding and core into the dual circuit at points corresponding dualitywise to the points in the original circuit at which a relay winding and its associated front contacts are located.

Figure 1:
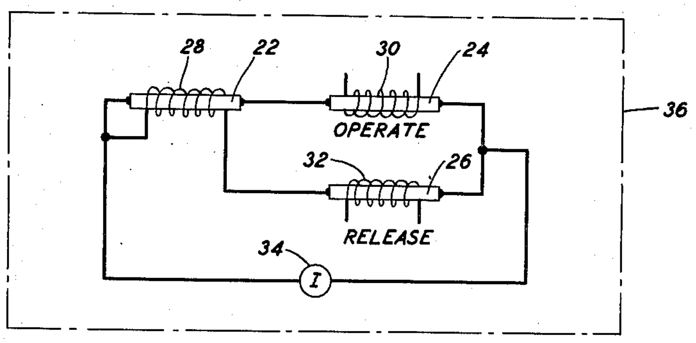
Fig. 1 shows a bistable cryotron circuit in accordance with one aspect of the invention.

Referring more specifically to the drawings, Fig. 1 shows a bistable cryotron circuit. The circuit includes three cryotrons. The cryotrons have central core elements 22, 24, and 26, and have windings 28, 30, and 32 associated respectively with the individual core elements. The cryotron including core 22 and winding 28 is the bistable circuit element; the cryotron including core 24 and winding 30 is the "operate" cryotron, and the cryotron including core 26 and winding 32 is the "release" cryotron. The cryotron circuit is energized by a current source 34 which supplies a substantially constant current. One end of the winding 28 is connected to one terminal of the core 22. The other terminal of core 22 is connected in series with the core 24 of the operate cryotron. The other end of the winding 28 is connected to the core 26 of the release cryotron. The current source 34 is connected in series with the two parallel paths defined in the preceding sentences. With a constant current being supplied by the source 34, current flows either through cores 22 and 24 or through the winding 28 and the core 26.

In operation, when windings 28 and 30 are not energized, current flows through the superconducting cores 22 and 24. When the winding 30 of the operate cryotron is energized, however, core 24 is brought out of the superconducting state, and current is forced through the path including the winding 28 and the core 26. The magnetic field induced by the winding 28 in the core 22 brings the core 22 out of the superconducting state. Accordingly, even after the de-energization of the winding 30 associated with the operate cryotron, current continues to flow through the winding 28 and the superconducting core 26.

When the release winding 32 is energized, the impedance of the path including the winding 28 and the core 26 is significantly greater than that including the two cores 22 and 24. Current therefore shifts to the path including cores 22 and 24, winding 28 is de-energized, and core 22 returns to the superconducting state. Current continues to flow in the preferred path including the two cores 22 and 24 rather than that including winding 28 and core 26 even after the release winding 32 is de-energized. This is a result of a superconducting phenomenon through which the ratio of current in two parallel paths is inversely proportional to the ratio of the inductive reactances of the paths. The circuit of Fig. 1 therefore constitutes a simple bistable circuit which requires only three cryotrons.

The rectangle 36 enclosing the cryotron circuit of Fig. 1 represents a cooling enclosure. For example, the cryotron circuits may be immersed in liquid helium, as disclosed in the article by Mr. D. A. Buck cited above. In this case, the cores 22, 24, and 26 would be made of tantalum, and the windings 28, 30, and 32 would be of niobium wire. Other combinations of cooling liquid and core and winding materials may, of course, be employed. However, the windings must be of a material which is super-conducting even in the presence of a moderate magnetic field within the cooling enclosure 36, while the cores must be of a material having a transition temperature just below the temperature within the cooling enclosure 36 so that a magnetic field quickly brings the cores out of the superconducting state.

Figure 2:
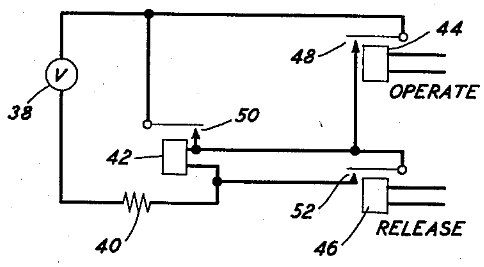
Fig. 2 is a known relay circuit diagram.

The circuit of Fig. 2 is the front-contact relay equivalent of the cryotron circuit of Fig. 1. This relay circuit includes the voltage source 38, the resistor 40, and the three relays 42, 44, and 46. When the operate relay 44 is energized, the contacts 48 are closed, and relay 42 is energized. The energization of relay 42 closes the hold circuit through contacts 50, and relay 42 remains energized even after the de-energization of relay 44. When the release relay 46 is energized, contacts 52 are closed. This has the effect of shunting the winding of the relay 42 and thus de-energizing it. The relay circuit of Fig. 2 is therefore restored to its original state, with contacts 50 open following the energization of the release relay 46.

It was stated above that the relay circuit of Fig. 2 is the equivalent of the cryotron circuit of Fig. 1. It will now be shown that the cryotron circuit of Fig. 1 is, in fact, the dual of the relay circuit of Fig. 2. In order to demonstrate this duality and to transform relay circuits in general into cryotron circuits, it is extremely useful to employ detached contact circuits. Accordingly, the detached contact version of the circuit of Fig. 2 is shown in Fig. 3.

Figure 3:
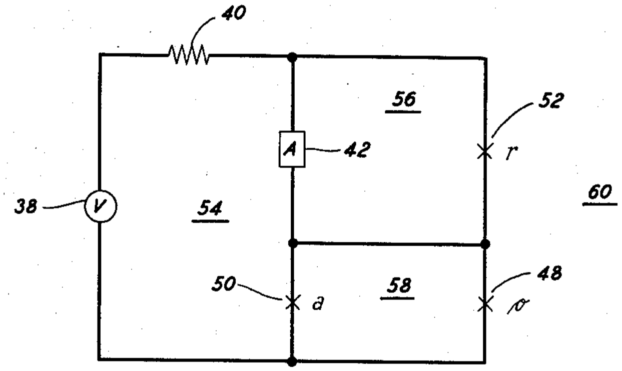
Fig. 3 is a detached contact version of the relay circuit of Fig. 2.

In Fig. 3, the voltage source 38 is connected in series with the resistor 40, the relay winding 42, and the contacts 50. The make contacts 50 are shown in the usual manner for detached contacts by an *x* on the lead in which the contacts are located. In addition, the relay winding 42 is designated by the symbol A, and the symbol *a* is associated with the make contacts 50 to indicate the association of contacts and relay. The operate contacts 48 are connected in parallel with the front contacts 50. The make contacts 48 have the letter *o* associated with them to indicate that the contacts are associated with an operate relay (not shown). Similarly, the contacts 52, which are in shunt with the relay winding 42, are designated by the letter *r* to indicate association with a release relay (not shown).

In transforming the circuit of Fig. 3 into its dual circuit, each mesh must be converted into a node. Referring again to Fig. 3, the circuit may be considered to have four meshes or regions. These are designated 54, 56, 58, and 60 in Fig. 3. The mesh 60 in Fig. 4 includes the circuit elements in the outermost loop of the circuit.

Figure 4:
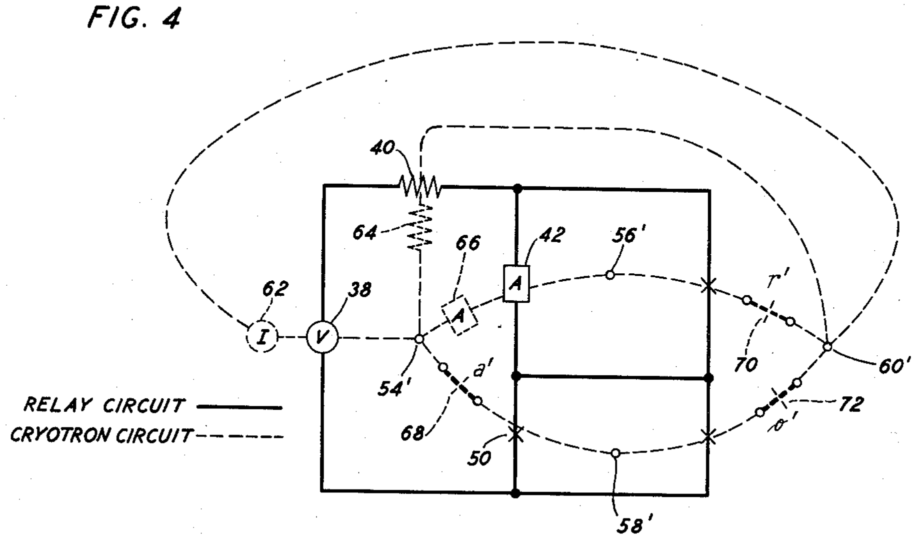
Fig. 4 illustrates a graphical technique for transforming a relay circuit into a comparable cryotron circuit.

In Fig. 4, a node point has been placed in each of the regions or meshes designated above in connection with Fig. 3. These node points are designated 54', 56', 58', and 60' to correspond to the comparable regions 54, 56, 58, and 60 of Fig. 3. Each circuit element included in each of the meshes in the circuit of Fig. 3 is now transformed into the dual of the original circuit element and is connected to the corresponding node. Thus, for example, the mesh 54 includes the voltage source 38, the resistor 40, the relay winding 42, and the relay contacts 50. In Fig. 4, the current source 62, the conductance 64, the current actuated winding 66, and the break contact 68 correspond to the elements 38, 40, 42, and 50, respectively. The new circuit, which is the dual of the circuit of Fig. 3, is shown in Fig. 4 in dashed lines. Thus, in Fig. 4 the circuit elements 62, 64, 66, and 68 are connected to node 54'. Similarly, the winding 66 and the break contacts 70 are connected to the node 56'. Similarly, the break contacts 68 and 72 are connected to the node 58'. The one remaining node 60' has the contacts 70 and 72, the conductance 64, and the current source 62 connected to it.

Figure 5:
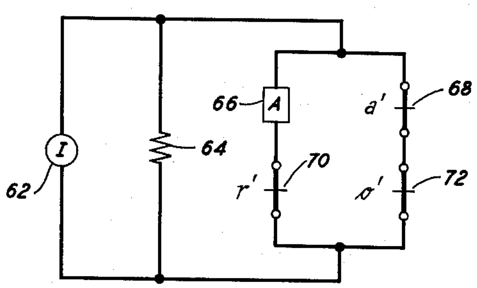
Fig. 5 shows the cryotron circuit equivalent of the relay circuit of Fig. 3 as obtained by the graphical transformation indicated in Fig. 4.

Fig. 5 is a redrawn version of the circuit shown in dashed lines in Fig. 4. The reference numerals of the elements of Fig. 5 correspond to the reference numerals used in the dashed line circuit of Fig. 4. To distinguish a cryotron core element used as a control circuit from the break contacts of a relay, the symbol for a relay break contact has been modified by the insertion of terminal points in a lead on either side of the transverse line on the lead which normally indicates break contacts.

In the use of letters to indicate control windings and the associated controlled element, whether a relay contact or a cryotron core, the following convention is employed. First, capital letters are used inside the box indicating the winding. Lower case letters are employed to designate relay contacts, and the letters indicate the winding with which the contacts are associated. The lower case letters are either unprimed or primed, depending on whether make or break contacts, respectively, are indicated. Similarly, the core element of a cryotron is represented by a lower case letter. In view of the fact that cryotron cores always correspond to the break contacts of a relay, the corresponding lower case letters are always primed.

Now, comparing the circuits of Figs. 5 and 1, it may readily be seen that Fig. 5 is the "detached contact" equivalent of the circuit of Fig. 1. In Fig. 5, the current source 62 corresponds to the current source 34 of Fig. 1.

The current-actuated relay (cryotron) winding 66 and its associated break contact (core) 68 correspond to the winding 28 and core 22 of one of the cryotrons in Fig. 1. The break contacts (cryotron cores) 70 and 72 find their equivalents in the cores 26 and 24, respectively, of Fig. 1. The conductance 64 in Fig. 5 is included in the power supply 34 of Fig. 1.

In the description of Figs. 1 through 5, a bistable cryotron circuit and the associated control circuits were first described and then the techniques for deriving it from the equivalent relay circuit were set forth. Although the particular circuits which were employed were relatively simple, these techniques are also applicable to any "planar" relay circuit which has only front contacts. The term "planar" as applied to a circuit network means that the circuit in question may be drawn in a single plane without crossovers. The geometric technique for transforming a relay circuit into its cryotron dual as shown in Fig. 4 is applicable to any such planar network.

A straightforward technique for transforming any relay circuit into an equivalent cryotron circuit involves the preliminary transformation of the relay circuit into a planar front contact circuit. To indicate that any relay contact circuit may be transformed into a planar relay cricuit which is the equivalent of the original circuit, reference is made to page 43 and following of a text entitled "The Design of Switching Circuits" by W. Keister, A. E. Ritchie, and S. H. Washburn, D. Van Nostrand Company, Inc., 1951. On pages 43 and 44 of this text a technique for analyzing bridge type circuits is set forth. The series parallel equivalent of a bridge type network is formed by tracing all possible paths between the input and output terminals of the bridge network. These paths indicate all the conditions for closure for the network, and may be drawn as indicated in Fig. 4–14–B as the circuit equivalent of the bridge network. Similarly, any switching circuit involving crossovers may be analyzed by investigating all the conditions for closure of the network, and then the corresponding series parallel circuit may be drawn. Although the resulting circuit will in some cases be relatively complex, this technique clearly indicates that non-planar relay circuits may in general be transformed into corresponding planar circuits. The planar circuits will, of course, include a somewhat greater number of contacts and relays.

It has been stated above that relatively complex relay circuits may be transformed into the corresponding cryotron circuits. In the course of describing Figs. 6 through 9, the steps involved in such a transformation will be explicitly set forth.

Figure 6:
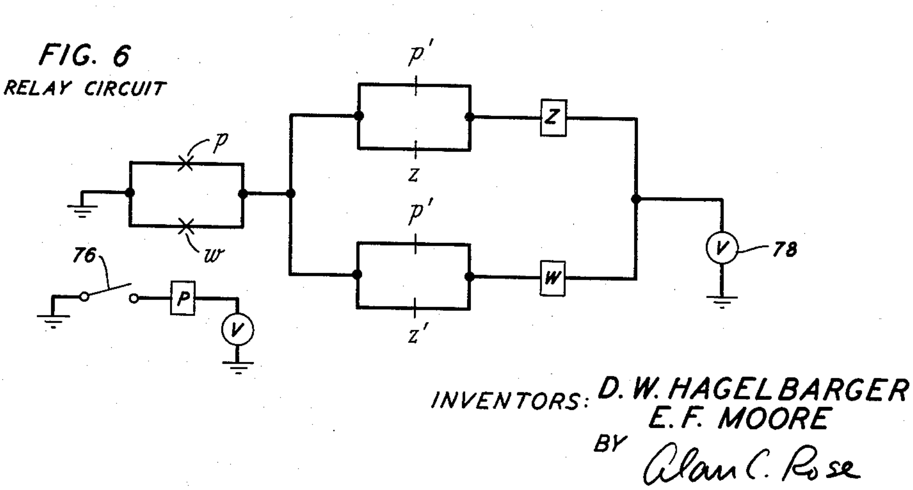
Figs. 6, 7, 8 and 9 represent the successive steps employed in transforming a typical relay circuit into the dual cryotron circuit.

The circuit of Fig. 6 represents a simple frequency division circuit. The relays W and Z in Fig. 6 operate once for each two energizations of the relay P. In the input circuit of Fig. 6, the switch 76 is operated periodically and the relay winding P is therefore energized periodically. The front contacts *p* are closed whenever the relay P is energized; and the two pairs of contacts *p'* are closed whenever relay P is de-energized.

In operation, it will be assumed initially that relays W and Z are de-energized. When relay P is energized, the winding of the relay W is energized by the closure of a circuit from ground through contacts *p*, the back contacts *z'* of relay Z, and the winding of relay W to the voltage source 78. The relay W remains energized through the hold contacts *w* even after relay P is de-energized, and contacts *p* are opened. At the time relay P is de-energized, however, contacts *p'* associated with the input circuit of both relay W and relay Z are closed. The energization of relay Z opens contacts *z'* through which relay W was initially energized. When relay P is energized the second time, contacts *p'* associated with winding W are opened and the winding W is de-energized. This cycle is repeated, and relay W is energized once for every two operations of relay P. Similarly the relay Z has a cycle of operation in which it operates once for every two energizations of relay P. Accordingly, the circuit of Fig. 6 constitutes a frequency division circuit. The operation of the circuit of Fig. 6 is analyzed in somewhat greater detail on pages 168 through 172 of the text "The Design of Switching Circuits," which was cited above.

The first step in transforming a relay circuit having a set of relays having both front and back contacts into a relay circuit having only front contacts is to add a second set of relays, each of which corresponds respectively to one of the relays in the first set. In addition, each relay in the second set is energized when the corresponding relay in the first set is de-energized, and vice versa.

Figure 7:
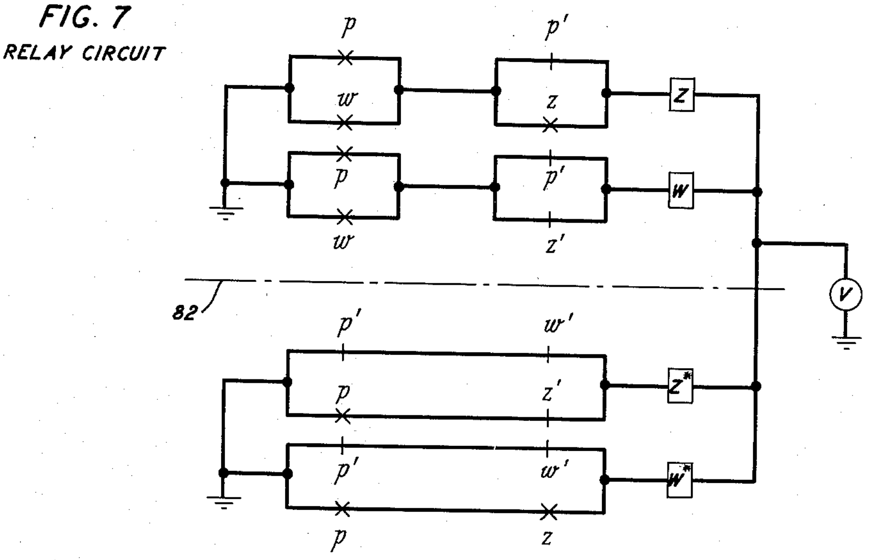

In Fig. 7, the circuit above the dash-dot line 82 corresponds in operation to that of the circuit of Fig. 6. The only change in the circuit of Fig. 7 above line 82 as compared with the circuit of Fig. 6 is in the energization circuits or "operate paths" of the relays W and Z. Instead of using one circuit in which the *p* and *w* contacts were in parallel, duplicate circuits have been employed in Fig. 7.

In Fig. 7, the relays W and Z constitute a first set of relays and the relays W* and Z* constitute a second set of relays. As mentioned above, the relay W* is energized when the relay W is de-energized, and vice versa. Similarly, the state of the relay Z* is always opposite to that of the relay Z. To satisfy this requirement, the operate paths to the relays W* and Z* must always be open when the corresponding operate paths to the relays W and Z are closed, and vice versa. Two switching networks which have this relationship with one another are termed the negative of each other. A first circuit including only switching contacts, which is the dual of a second switching circuit including only contacts, is also the negative of the circuit; that is, the first circuit is always closed when the second circuit is open, and vice versa. By taking the dual of each of the operate circuits for the relays W and Z in Fig. 7 in accordance with the geometric method shown schematically in Fig. 4, the operate circuits for the relays W* and Z* are produced.

Figure 8:
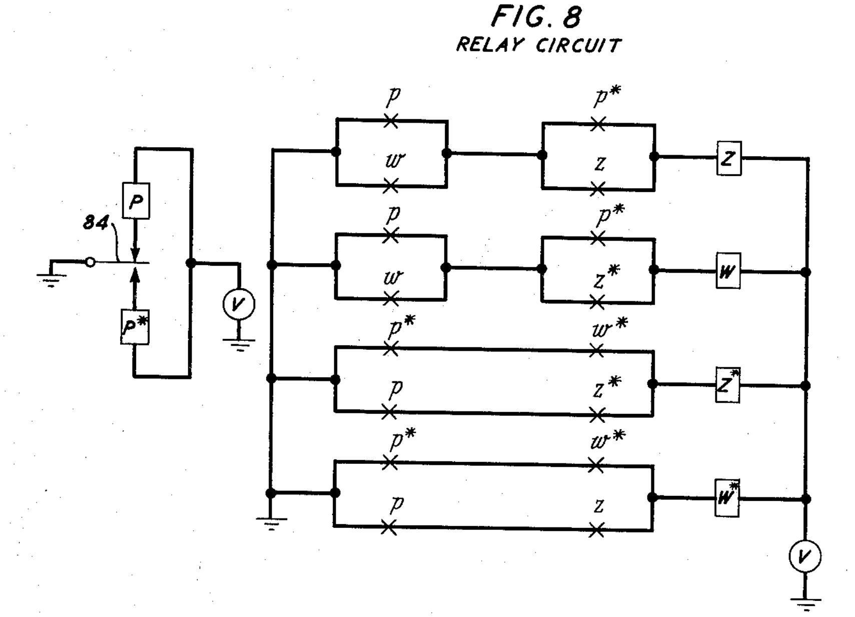

Fig. 8 illustrates the front contact relay circuit corresponding to the circuit of Fig. 6. Referring to Fig. 8, a double-throw switch 84 has been substituted for the switch 76 of Fig. 6. In addition, two relays P and P* are coupled for alternate energization by the switch 84 so that they are always in opposite states. The operate circuits of Fig. 8 correspond very closely to those of Fig. 7. However, in Fig. 8 the front contacts of relays P*, W*, and Z* have been substituted for the back contacts of relays P, W, and Z, respectively. Thus, considering the operate circuit for relay W in Fig. 7, it included the contacts *p'* and *z'* in parallel. In Fig. 8, this parallel combination has been changed to the contacts *p** and *z**. The other back contacts which appeared in Fig. 7 have been changed to the front contacts of relays P*, W*, and Z* in a similar manner.

Figure 9:
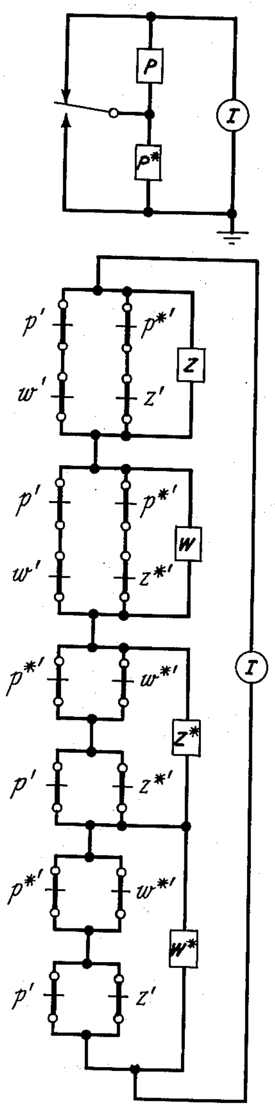

The front contact circuit equivalent of the relay circuit of Fig. 6 has now been obtained. This may readily be changed into the dual cryotron circuit by the geometric technique described in detail above in connection with Fig. 4. The resultant circuit is shown in Fig. 9. As expected, the circuit of Fig. 9 includes the cryotron windings connected in series, rather than in the parallel manner characteristic of relay circuits. In addition, the cryotron equivalent of back contacts appears throughout the schematic in place of the front contacts employed in the circuit of Fig. 8. The circuit of Fig. 9 therefore constitutes a frequency division circuit which operates as the dual of the circuit of Fig. 6. Specifically, control windings, W, Z, W*, and Z* are energized once for every two operations of the cryotron windings P and P*. It may be noted that the input circuit for Fig. 9 appears at the top of this figure. While the input circuit of Fig. 9 is suitable for use at superconducting temperatures, it would be preferable to utilize an input circuit such as that shown in Fig. 8 if the double-throw switch is outside the cryostat.

Figure 10:
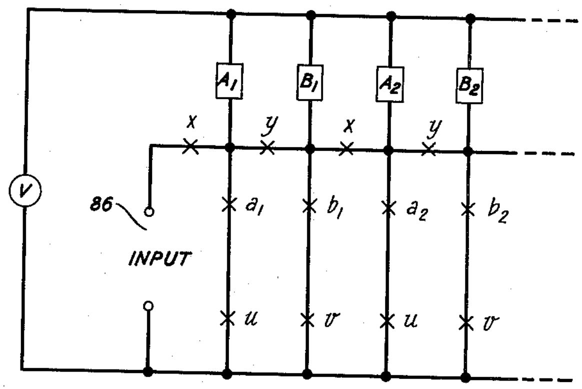
Fig. 10 is a relay shift register circuit.
Figure 11:
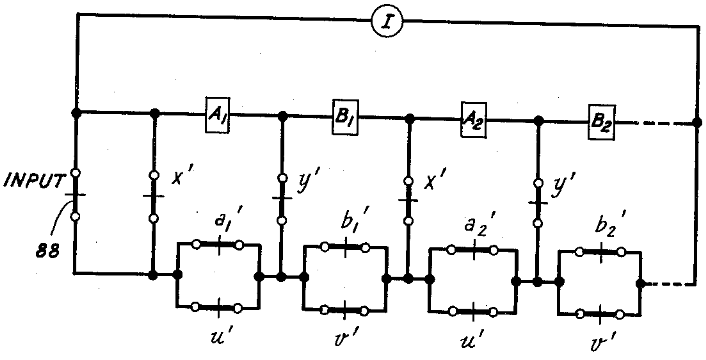
Fig. 11 is the cryotron shift register circuit which is the dual of the relay circuit of Fig. 10, in accordance with the invention.

Fig. 10 shows a shift register circuit which is built up of bistable relay circuits having only front contacts. Fig. 11 is the cryotron dual of the shift register of Fig. 10.

Referring more specifically to Fig. 10, binary information may be stored in the shift register made up of the relays $A_1$, $A_2$ . . . in terms of the energization or de-energization of each of these relays. When appropriate control signals are employed to close the contacts *u*, *v*, *x*, and *y* in a prescribed sequence, information is shifted from the relay $A_1$ to the relay $A_2$ following intermediate storage in the relay $B_1$. Binary information may therefore be shifted along the relays while input signals applied at terminals 86 are entered in the first relay $A_1$ of the shift register.

Considering the operation of the circuit of Fig. 10, in its initial state contacts *u* and *v* are closed and contacts *x* and *y* are open. In order to transfer signals from relay $A_n$ to relay $B_n$, the following steps are required. First, the contacts *v* are opened, clearing relay $B_n$. Then contacts *y* are closed so that relay $B_n$ assumes the same state as relay $A_n$. The contacts designated *v* are then closed, and finally the transfer to the B set of relays is completed by opening the *y* contacts.

In order to complete the transfer from relay $A_n$ to relay $A_{n+1}$, information in relay $B_n$ must be shifted to relay $A_{n+1}$. This is accomplished by the following steps. Initially, contacts *u* are opened, clearing all of the relays designated A. The *x* contacts are then closed and relay $A_{n+1}$ assumes the state of relay $B_n$. Contacts *u* are then closed and contacts *x* are opened to restore the original conditions and to complete the transfer. It is also noted that at the time of the transfer from $B_n$ to $A_{n+1}$, binary input information is received by relay $A_1$ from input terminals 86.

Fig. 11 is the cryotron dual of the relay shift register of Fig. 10. Binary information is stored in the shift register of Fig. 11 in terms of the state of the cryotron windings $A_1$, $A_2$ . . . . The additional set of cryotrons $B_1$, $B_2$ . . . is provided for transfer purposes, as in the case of the relays $B_1$, $B_2$ . . . in Fig. 10. Input binary information is supplied to the input cryotron core 88 in terms of the blocking or unblocking of this core. Considering the operation of the shift, register, the cores *x'* and *y'* are initially unblocked and in the superconducting state, whereas cores *u'* and *v'* are initially in the blocked state. In the transfer of digital information from cryotron winding $A_n$ to winding $A_{n+1}$, an intermediate step involves shifting the information to cryotron winding $B_n$. This is accomplished by unblocking cores *v'* and blocking cores *y'*. When this is done, cryotron winding $B_n$ assumes the state of winding $A_n$. To restore isolation between the cryotron windings $A_1$, $A_2$ . . . and cryotron windings $B_1$, $B_2$ . . . , core *v'* is blocked and core *y'* is unblocked. To complete the transfer from winding $B_n$ to cryotron winding $A_{n+1}$, cores *u'* are unblocked and cores *x'* are blocked. Winding $A_{n+1}$ then assumes the state of winding $B_n$. Following this step, the isolation of successive stages is restored by blocking cores *u'* and unblocking the cores designated *x'*.

In the circuit of Fig. 10, the sets of contacts designated *u* must be energized simultaneously. The individual contacts in the other sets of control contacts *v*, *x*, and *y* must also be energized simultaneously. This may be accomplished by the use of a number of relays, each having one front contact, which are energized simultaneously. However, a less expensive method is to provide a single relay having a number of pairs of front contacts equal to the number of stages of the shift register. Similarly, in the case of the cryotron shift register of Fig. 11, the set of cores designated *u'* must be energized at approximately the same time. Similarly, the cores in each of the sets of cores designated *v'*, *x'*, and *y'* must be energized at approximately the same time. This may be accomplished by the use of a plurality of cryotrons having their windings energized at the same instant or by the use of a compound cryotron element having a plurality of cores. Such a cryotron element is, of course, the dual of a relay having several front contacts.

In connection with the circuit of Fig. 11, it may be noted that the information stored in the A set of relays can be transferred to the B set of relays without changing the state of the A relays. This property of "nondestructive read-out" is a useful property for storage elements in many applications. Magnetic core memory circuits do not generally have this property. Cryotron elements with their straight cores can also be more readily assembled into memory arrays than toroidal magnetic cores, which require the threading of windings through the core openings.

Figure 12:
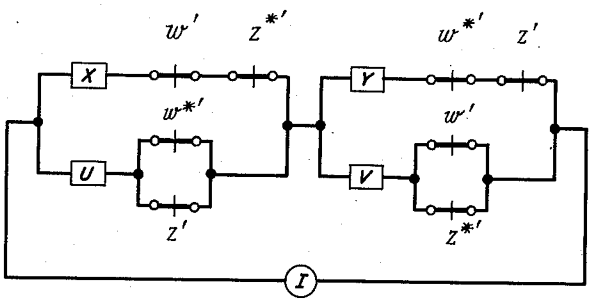
Fig. 12 shows a typical circuit which may be employed for energizing the cryotron windings associated with the controlling cryotron cores of Fig. 11.

For completeness, Fig. 12 shows one suitable circuit for energizing the cryotron windings associated with the cryotron cores designated *u*, *v*, *x*, and *y* in Fig. 11. The cryotron windings in the circuit of Fig. 12 are controlled by the cores of a suitable frequency division circuit, such as that shown in Fig. 9. Cryotron winding X is energized when cryotron winding U is de-energized, and vice versa. Accordingly, their operate circuits are in parallel. The operate circuit for winding X includes cryotron cores $$w' \text{ and } z^{*\prime}$$

connected in series, and the operate circuit for cryotron winding U includes the cores $$w^{*\prime} \text{ and } z'$$

connected in parallel. Similarly, each of windings Y and V are energized when the other is de-energized, and their operate paths are also paralleled. The operate circuit for cryotron winding Y includes cores $$w^{*\prime} \text{ and } z'$$

connected in series; the operate circuit for winding V includes cores $$w' \text{ and } z^{*\prime}$$

connected in parallel. For the purposes of Fig. 12, it has been assumed that the windings U, V, X, and Y each include a plurality of core elements. If it is desired to use cryotrons having only one core, several cryotron windings would be connected in series at the points where the cryotron windings U, V, X, and Y are located in Fig. 12.

Figure 13:
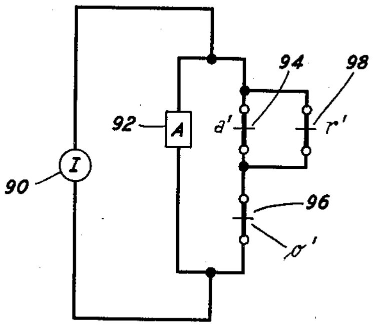
Fig. 13 is another basic bistable cryotron circuit in accordance with the invention.

Fig. 13 illustrates a bistable circuit which is similar to that of Fig. 1 in that it employs only three cryotrons. In the circuit of Fig. 13, current from the source 90 is switched between two parallel branch circuits which include the winding 92 and core 94, respectively, of a single cryotron. The branch circuit including the core 94 also includes an operate core 96 connected in series with core 94, and a release core 98 connected in parallel with core 94. In operation, current normally flows through the low resistance path including cores 94 and 96, in view of the inductive reactance of winding 92.

When the operate core 96 is blocked, however, the current is switched to the branch circuit including winding 92. The release core 98 is normally in the blocked state. Accordingly, even after the unblocking of the operate core 96, the bistable circuit remains in the state in which current is flowing through winding 92. When the cryotron release core 98 is unblocked, however, current switches from the parallel branch circuit including the winding 92 to that including the cores 96 and 98. Following the deenergization of winding 92, the core 94 returns to the unblocked state. Accordingly, the bistable circuit is returned to its original condition.

Comparing the circuit of Fig. 13 with that of Fig. 5, it may be noted that there are many points of similarity. In particular, it may be noted that both circuits include two parallel paths with the winding of a cryotron in one of the two parallel paths, and the core of the same cryotron in the other path. In addition, an operate core of the bistable circuit is connected in series with the other cryotron core in one of the parallel branch circuits. The only significant difference between the two circuits, therefore, is the location of the release cryotron core. In the circuit of Fig. 5, it is connected in series with the winding 66 of the principal cryotron. In Fig. 13, however, the release core shunts the core 94 associated with the principal cryotron. In Fig. 5, the blocking of the release cryotron core sifts the current from the parallel path including the cryotron winding 66 to the other parallel path by increasing the resistance of the path including the winding. In the bistable circuit of Fig. 13, the release cryotron core is unblocked to shift the current from the path including the winding A to the other parallel path. In each case, however, it may be noted that the ratio of the impedance of the path including the winding to that of the other path is increased to a value greater than one by the change of state of the release cryotron core.

Figure 14:
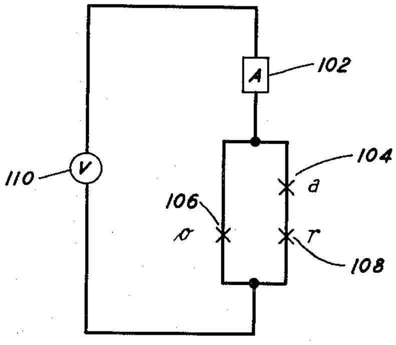
Fig. 14 is the relay circuit dual of the cryotron circuit of Fig. 13.

The relay circuit of Fig. 14 is the dual of the bistable cryotron circuit of Fig. 13. The circuit of Fig. 14 includes the relay winding 102, the contacts 104 associated with the relay winding 102, the operate contacts 106, the release contacts 108, and the voltage source 110. When the operate contacts 106 are closed, the relay winding 102 is energized and contacts 104 are closed. Assuming that the release contacts 108 are normally in the closed state, a holding circuit is established which maintains winding 102 energized even after the opening of operate contacts 106. When the release contacts 108 are opened, however, the holding circuit is interrupted and winding 102 is deenergized. The bistable circuit is then restored to its original state.

In reviewing the cryotron circuits described in the present specification, it is worthwhile to note the circuit configurations which are characteristic of one class of the simplified cryotron circuits developed in accordance with the present invention. In the cryotron circuits shown in Figs. 5 (Fig. 1 shows the same circuit), 9, 11, and 13, first and second parallel branch circuits are provided, and the winding and core of a single cryotron are located respectively in the first and second branch circuits. Additional cryotron cores are also provided in each case to switch current between the branch circuit including the core and the branch circuit including the winding. In Fig. 1, for example, this function is accomplished by the cryotron cores 24 and 26, whereas in Fig. 13, it is accomplished by the cores 96 and 98. It is also important to note that in each case the second branch circuit includes no cryotron windings.

In the foregoing description, it has been shown that cryotron circuits may be developed which operate in much the same manner as corresponding relay circuits. It should also be noted that relay circuits may include relays which are slow in operating or releasing. In the case of cryotron circuits, this effect may be accomplished by using cryotron cores of different diameters or materials. For example, and as suggested in the article by D. A. Buck cited above, the speed of operation of cryotron circuits may be increased by employing hollow cylindrical core elements. The use of different materials for the core element will also change the speed of operation of one cryotron with respect to another. In the relay technology, it is also possible to have contacts on a single relay which close or open before other contacts on the same relay. In the cryotron equivalent circuits, similar effects may be obtained by using core elements of different materials or by using coaxial core elements of a single material.

It is to be understood that the above-described arrangements are illustrative of the application of the principles of the invention. Numerous other arrangements may be devised by those skilled in the art without departing from the spirit and scope of the invention.

What is claimed is:

1. A bistable apparatus including a plurality of cryotron cores having less than four cryotron windings, said apparatus comprising a first circuit including the winding of a first one of said cryotrons and the core of a second one of said cryotrons, a second one of said windings coupled to said first circuit for inhibiting current in said first circuit, a second circuit including the core of said first cryotron connected in parallel with said first circuit, and a third one of said windings coupled to said second circuit for inhibiting current in said second circuit.

2. In combination, a plurality of cryotron windings connected in series, means for applying current to said series connected cryotron windings, a first branch circuit including a cryotron core connected in shunt with one of said windings, and a second branch circuit including another cryotron core connected in shunt with another of said windings, the cryotron components included in said branch circuits consisting only of cryotron cores.

3. In combination, two parallel branch circuits, a current source connected in series with said two parallel branch circuits, a first cryotron having its winding connected in a first one of said branch circuits and its core connected in the second of said branch circuits, the core of a second cryotron being connected in series with the core of said first cryotron in said second branch circuit, and means including an additional cryotron core forming part of one of said two branch circuits for increasing the ratio of the impedance of said first branch circuit to that of said second branch circuit to a value which is greater than one, the cryotron components connected in said second branch circuit consisting only of cryotron cores.

4. A bistable circuit comprising a cryotron having a winding and core, one terminal of said core being directly connected to one end of said winding, first and second inductively dissimilar parallel circuits, a current source connected in series with said first and second parallel circuits, the first of said parallel circuits including the winding of said cryotron and the second of said parallel circuits including the core of said first cryotron and the core of a second cryotron connected in series, and means including an additional cryotron core for increasing the ratio of the impedance of said first circuit to that of said second circuit to a value which is greater than one.

5. A bistable cryotron circuit including two parallel branch circuits, a current source connected in series with said two parallel branch circuits, a plurality of cryotrons each including as components a core of inductively controllable selectively superconducting material and a control winding inductively coupled to said core, a first one of said cryotrons having its winding connected in a first one of said branch circuits and its core connected in the second of said branch circuits, the core of a second one of said cryotrons being connected in series with the core of said first cryotron in said second branch circuit, and means including an additional cryotron core for increasing the ratio of the impedance of said first branch circuit to that of said second branch circuit to a value which is greater than one, the cryotron components connected in said second branch circuit consisting only of cryotron cores.

6. A combination as defined in claim 5 wherein said additional cryotron core is connected in said first branch circuit in series with the winding of said first cryotron.

7. A combination as defined in claim 5 wherein said additional cryotron core forms part of said second branch circuit and is connected in parallel with the core of said first cryotron.

8. In combination, a plurality of circuit units each comprising two parallel branch circuits, a first cryotron having its winding connected in a first one of said branch circuits and its core connected in the second of said branch circuits, the core of a second cryotron being connected in series with the core of said first cryotron in said second branch circuit, and means including an additional cryotron core forming part of one of said two branch circuits for increasing the ratio of the impedance of said first branch circuit to that of said second branch circuit to a value which is greater than one, the cryotron components connected in said second branch circuit consisting only of cryotron cores; means for connecting said circuit units in series and means for connecting a current source to said series connected circuit units, whereby current flows through one of the two branch circuits of each of said circuit units.

9. In combination, a plurality of cryotron windings connected in series, means for applying current said series connected cryotron windings, a first branch circuit including a cryotron core connected in shunt with one set of said windings, and a second branch circuit including another cryotron core connected in shunt with another set of said windings, the cryotron components included in said branch circuits consisting only of cryotron cores.

10. In combination, two parallel branch circuits, a current source connected in series with said two parallel branch circuits, a cryotron having its winding connected in a first one of said branch circuits and its core connected in the second of said branch circuits, and a branch circuit, the cryotron components included in said second cryotron having its core connected in said second first branch circuit consisting of at least one more cyrotron winding than is included in said second branch.

References Cited in the file of this patent

UNITED STATES PATENTS 2,832,897 Buck ---------------- Apr. 29, 1958

OTHER REFERENCES

"The Cryotron—A Superconductive Computer Component," Buck, Proc. of the IRE, vol. 44, No. 4, April 1956, pp. 482 through 493.

UNITED STATES PATENT OFFICE
CERTIFICATE OF CORRECTION

Patent No. 2,977,575 March 28, 1961

David W. Hagelbarger et al.

It is hereby certified that error appears in the above numbered patent requiring correction and that the said Letters Patent should read as corrected below.

Column 12, line 32, after "current" insert -- to --; line 44 beginning with "branch circuit," strike out all to and including "said second branch" in line 47, same column 12, and insert instead -- second cryotron having its core connected in said second branch circuit, the cryotron components included in said first branch circuit consisting of at least one more cryotron winding than is included in said second branch --.

Signed and sealed this 25th day of December 1962.

(SEAL)
Attest:

ERNEST W. SWIDER
Attesting Officer

DAVID L. LADD
Commissioner of Patents